United States Patent
Kenworthy et al.

(10) Patent No.: US 10,578,020 B2
(45) Date of Patent: Mar. 3, 2020

(54) INTEGRAL OIL TANK HEAT EXCHANGER

(71) Applicant: Unison Industries, LLC, Jacksonville, FL (US)

(72) Inventors: Michael Thomas Kenworthy, Beavercreek, OH (US); Lonnie Ray Stewart, Jr., Carlisle, OH (US)

(73) Assignee: Unison Industries, LLC, Jacksonville, FL (US)

( * ) Notice: Subject to any disclaimer, the term of this patent is extended or adjusted under 35 U.S.C. 154(b) by 385 days.

(21) Appl. No.: 15/205,274

(22) Filed: Jul. 8, 2016

(65) Prior Publication Data

US 2017/0096938 A1    Apr. 6, 2017

Related U.S. Application Data (60) Provisional application No. 62/195,065, filed on Jul. 21, 2015.

(51) Int. Cl.
| | |
|---|---|
| *F02C 7/14* | (2006.01) |
| *F02C 7/06* | (2006.01) |
| *F02C 7/224* | (2006.01) |
| *F02C 3/04* | (2006.01) |
| *F02C 7/22* | (2006.01) |

(52) U.S. Cl.
CPC ............ *F02C 7/14* (2013.01); *F02C 3/04* (2013.01); *F02C 7/06* (2013.01); *F02C 7/222* (2013.01); *F02C 7/224* (2013.01); *F05D 2220/32* (2013.01); *F05D 2240/35* (2013.01); *F05D 2260/213* (2013.01); *Y02T 50/671* (2013.01); *Y02T 50/676* (2013.01)

(58) Field of Classification Search
CPC ...... F02C 3/04; F02C 7/06; F02C 7/14; F02C 7/222; F02C 7/224; F05D 2220/32; F05D 2240/35; F05D 2260/213; Y02T 50/671; Y02T 50/676

See application file for complete search history.

(56) References Cited

U.S. PATENT DOCUMENTS

| | | | | |
|---|---|---|---|---|
| 3,180,406 | A | * 4/1965 | Oechslin | ............... F23M 5/085 |
| | | | | 126/109 |
| 3,280,903 | A | * 10/1966 | Stoddard, Jr. | ........... F01N 1/089 |
| | | | | 165/135 |

(Continued)

FOREIGN PATENT DOCUMENTS

| | | |
|---|---|---|
| GB | 498731 A | 1/1939 |
| JP | S54-51643 U | 4/1979 |

(Continued)

OTHER PUBLICATIONS

European Search Report and Opinion issued in connection with corresponding EP Application No. 16180134.5 dated Nov. 28, 2016.

(Continued)

*Primary Examiner* — Jesse S Bogue
(74) *Attorney, Agent, or Firm* — McGarry Bair, P.C.

(57) ABSTRACT

The present innovation relates to a gas turbine engine comprising an engine core with a combustion section, a fuel circuit fluidly coupled to the combustion section, an oil circuit fluidly coupled to the engine core, and an oil heat exchanger comprising a portion of the fuel circuit forming part of the oil circuit.

16 Claims, 8 Drawing Sheets

(56) References Cited

U.S. PATENT DOCUMENTS

| | | | | |
|---|---|---|---|---|
| 3,750,709 A * | 8/1973 | French | B21C 37/15 | 138/38 |
| 3,797,561 A | 3/1974 | Clark et al. | | |
| 4,151,710 A * | 5/1979 | Griffin | F02C 7/14 | 184/6.11 |
| 4,498,525 A * | 2/1985 | Smith | F02C 7/14 | 123/552 |
| 4,499,886 A * | 2/1985 | Hinds | F02M 31/16 | 123/514 |
| 6,092,590 A * | 7/2000 | Suttrop | B64G 1/50 | 165/154 |
| 6,237,322 B1 | 5/2001 | Rago | | |
| 6,502,630 B1 | 1/2003 | MacFarlane et al. | | |
| 6,675,881 B1 * | 1/2004 | Rago | F28D 7/106 | 138/38 |
| 6,793,483 B2 * | 9/2004 | Watanabe | F23D 11/103 | 431/158 |
| 7,930,953 B2 | 4/2011 | Frost | | |
| 8,240,365 B2 * | 8/2012 | Obana | F28D 7/0041 | 165/144 |
| 8,292,116 B2 * | 10/2012 | Saito | F01M 5/002 | 220/563 |
| 8,661,783 B2 * | 3/2014 | Foster | F02C 7/224 | 165/109.1 |
| 9,046,002 B2 | 6/2015 | Homeyer | | |
| 10,036,258 B2 * | 7/2018 | Mongillo | F01D 5/187 | |
| 2009/0038302 A1 * | 2/2009 | Yamada | F01N 3/0205 | 60/320 |
| 2009/0159246 A1 | 6/2009 | Cornet et al. | | |
| 2010/0205977 A1 * | 8/2010 | Annigeri | F02C 7/224 | 60/783 |
| 2013/0291514 A1 | 11/2013 | Suciu et al. | | |
| 2014/0251585 A1 * | 9/2014 | Kusuda | F28D 1/06 | 165/164 |

FOREIGN PATENT DOCUMENTS

| | | |
|---|---|---|
| JP | H10-160361 A | 6/1998 |
| WO | 2015126483 A2 | 8/2015 |

OTHER PUBLICATIONS

Machine translation and a Notification of Reasons for Refusal issued in connection with corresponding JP Application No. 2016-139869 dated Aug. 1, 2017.

* cited by examiner

FIG. 8A

INTEGRAL OIL TANK HEAT EXCHANGER

CROSS-REFERENCE TO RELATED APPLICATION

This application claims priority from U.S. Provisional Application No. 62/195,065 filed on Jul. 21, 2015, entitled Integral Oil Tank Heat Exchanger, which is incorporated herein by reference in its entirety.

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades.

Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft often require lubrication of moving components. In order to keep these components lubricated, oil or an oil/air mixture is fed through the engine to these components. This causes the oil to become hot. Hot oil can be used to warm fuel, while simultaneously cooling the oil. Typically, an oil cooler heat exchanger and an oil tank are separate components. Sometimes the oil cooler heat exchanger is mounted to a fuel manifold that is also common to the oil tank, and oil is piped from various locations such as the main gearbox lubrication system and engine lubrication system. However, these are typically kept as entirely separate systems for reasons associated with safety of flight.

BRIEF DESCRIPTION OF THE INVENTION

In one aspect, embodiments of the present innovation relate to a gas turbine engine comprising an engine core with a combustion section, a fuel circuit fluidly coupled to the combustion section, an oil circuit fluidly coupled to the engine core, and an oil heat cooler exchanger comprising a portion of the fuel circuit forming part of the oil circuit.

In another aspect, the present innovation relates to an oil tank assembly comprising an oil tank and a heat exchanger integrated with the oil tank and having a cooling conduit defined at least in part by a fuel line of a fuel circuit.

In yet another aspect, the present innovation relates to an oil cooling system comprising an oil tank, a heat exchanger comprising a fuel matrix in thermal conductive contact with at least a portion of the oil tank, and a bifurcated fuel line having a first conduit fluidly coupled to the fuel matrix and a second conduit wrapping around at least a portion of at least one of the oil tank or fuel matrix.

DESCRIPTION OF EMBODIMENTS OF THE INVENTION

The described embodiments of the present innovation are directed to an oil heat exchanger comprising a portion of the fuel circuit forming part of the oil circuit. The integrating of a portion of the oil circuit and the fuel circuit to form an oil heat exchanger provides for a more efficient system over prior designs. It is to be appreciated that the integral oil tank and heat exchanger of this innovation can include multiple heat exchangers.

For purposes of illustration, the present invention will be described with respect to the turbine for an aircraft gas turbine engine. It will be understood, however, that the invention is not so limited to turbine engines with fan and booster sections, and may have general applicability within a turbojet, a turbo engine, and engines, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
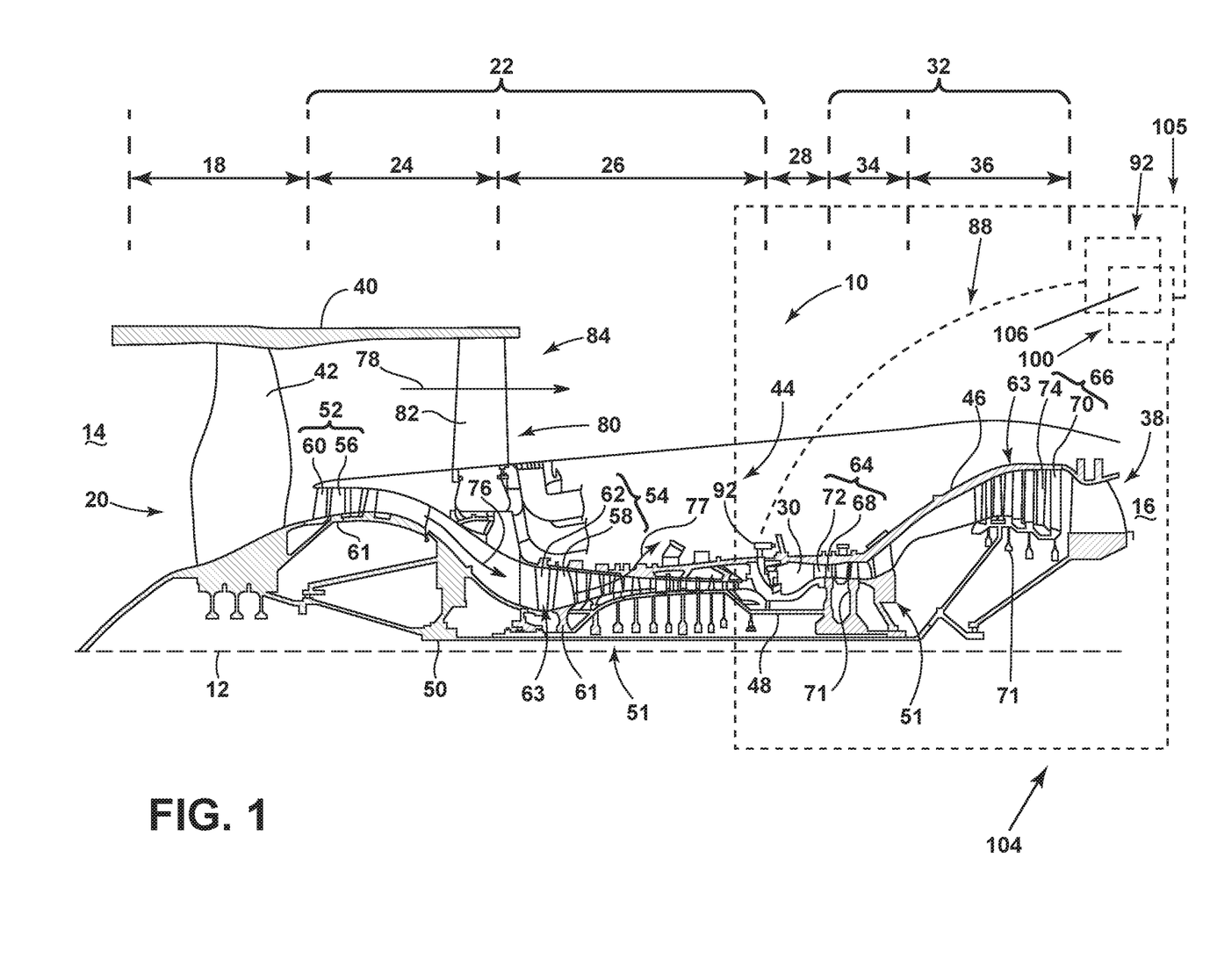
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. Fuel is provided to the combustor 30 by way of fuel nozzles 92. The fuel nozzles 92 are coupled to a fuel circuit 88, which is coupled to a fuel tank 90. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Oil can be used to lubricate moving components of the engine 10. Oil or an oil/air mixture is fed through the engine by way of an oil circuit 103 coupled to an oil tank 100, which can be the reservoir for all of the oil in the oil circuit 103. The oil circuit 103 comprises an oil inlet 104, or return, to the oil tank 100 and an oil outlet 105 from the oil tank 100 to circulate the oil. While it is shown to be coupled to core 44, oil can be provided to other portions of the engine 10. The oil circuit 103 and fuel circuit 88 can be integrated such that a portion of an oil cooling system forms a heat exchanger, referred to as an oil cooler heat exchanger 106, which is supplied cooling fluid from the fuel circuit 88. Therefore, an oil cooler heat exchanger 106 comprises a portion of the fuel circuit 88 and forms a part of the oil circuit 103.

Figure 2:
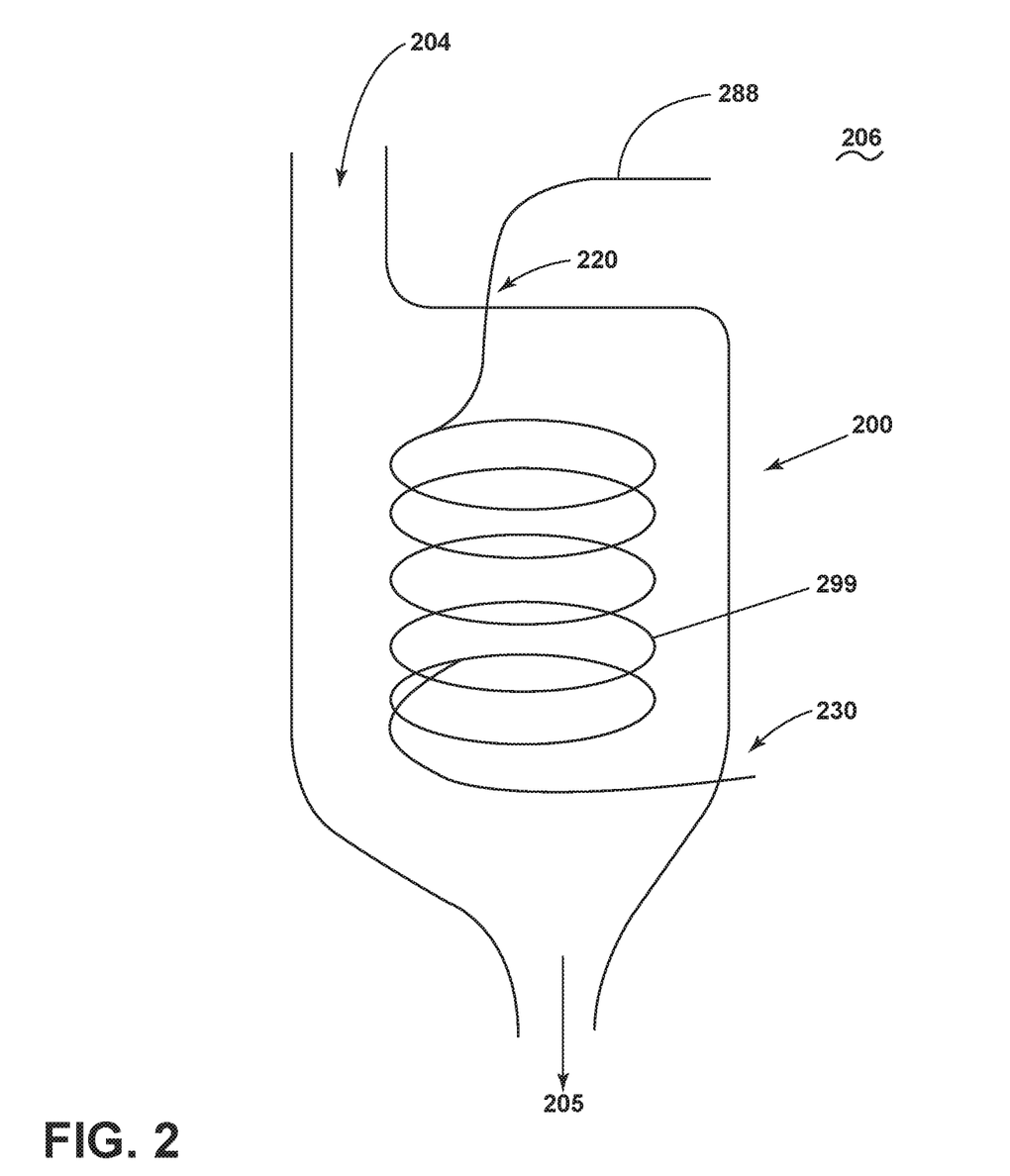
FIG. 2 is a schematic oil cooler heat exchanger.

FIG. 2 depicts a schematic of an oil cooler heat exchanger 206 wherein a portion of a fuel circuit 288 passes through the interior of the oil tank 200 as an immersion coil 299. In this configuration, the fuel circuit 288 is not integrated into the oil tank 100, which requires two openings 220, 230 in the oil tank 200 for the fuel circuit 288 to pass. The openings 220, 230 are not desirable and create possible leak sites for the oil in the oil tank 200. The present innovation addresses this problem by integrating a portion of the oil circuit 103 with the fuel circuit 88, for example, by forming a portion of the oil tank 100 such that it forms part of the fuel circuit 88.

As the embodiments of the present innovation relate to oil cooler heat exchangers with like parts, like parts will be identified with like numerals increasing by 100s, with it being understood that the description of the like parts of one embodiment applies to other embodiments, unless otherwise noted.

Figure 3:
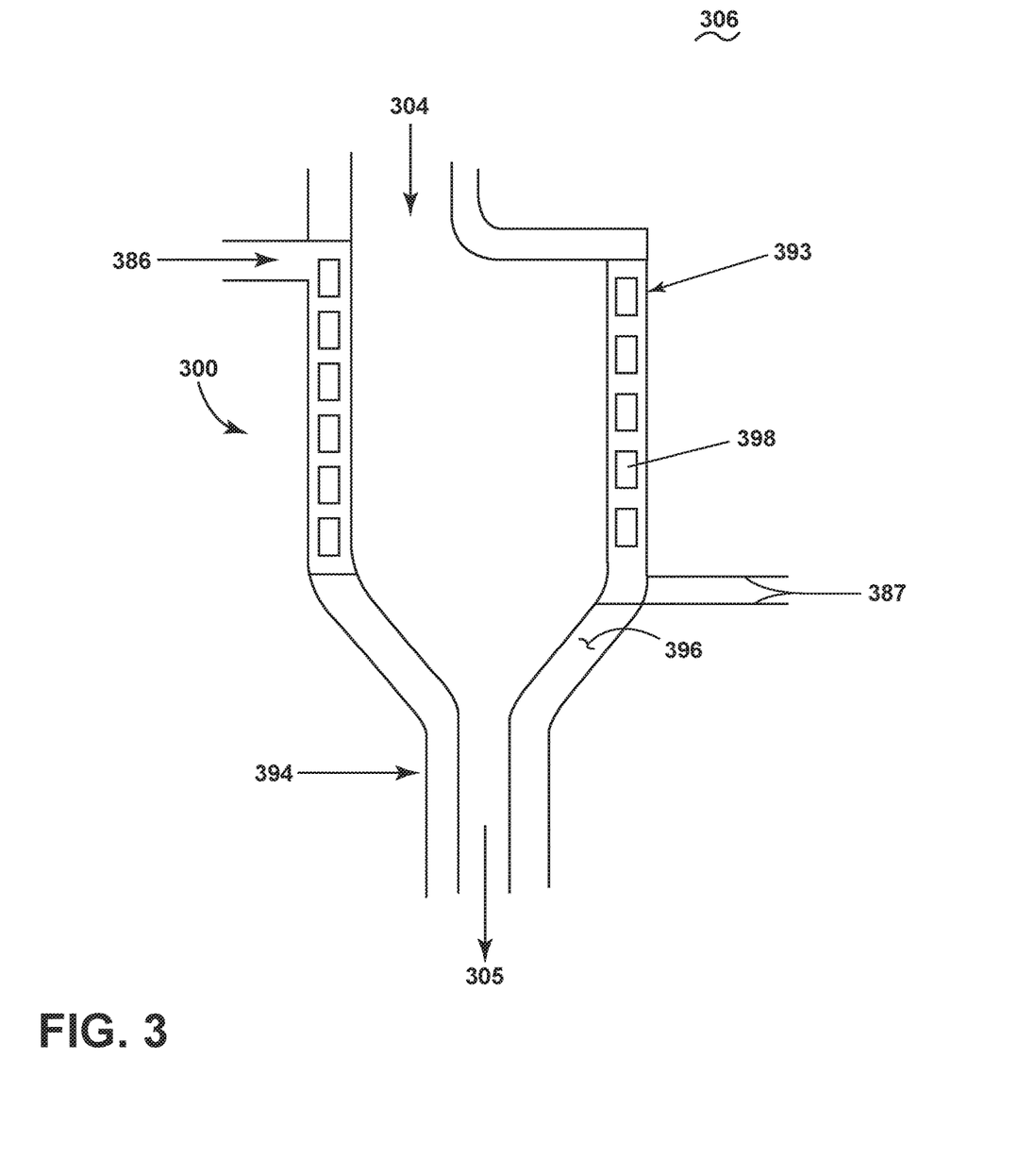
FIG. 3 is a schematic oil cooler heat exchanger according to an embodiment of the present innovation.

As an example embodiment, FIG. 3 illustrates an integral oil cooler heat exchanger 306 having a double wall, or rather a wall 394 with channels, or an internal passage 396, which makes multiple loops around the oil tank 300 to form a fuel matrix 398 on the internal passage 396 in the oil tank 300 housing 393, and/or an immersion coil 99. The internal passage 396, while shown as having multiple loops, need not form a loop about the oil tank 300. The internal passage 396 need only pass through the interior of the wall 394 forming the oil tank 300. The oil tank 300 comprises an oil inlet 304 where oil enters, and an oil outlet 305 where oil exits the oil tank 300. The oil inlet 304 may comprise a cover to the oil tank 300. Fuel enters the fuel matrix 398 through the fuel inlet 386 and exits the fuel matrix 398 via the fuel outlet 387. A fuel line between the fuel inlet 386 and the fuel outlet 387 defines a portion of the fuel circuit 88.

While the oil tank 300 can be described as having a double wall 394, the oil tank 300 could have a single wall of sufficient thickness that the internal passages 396 are formed within the interior of the wall. Also, while the multiple loops define a helical pattern, the internal passages 396 could be circular and fed by a common header, or they could intersect to form a matrix.

Figure 4:
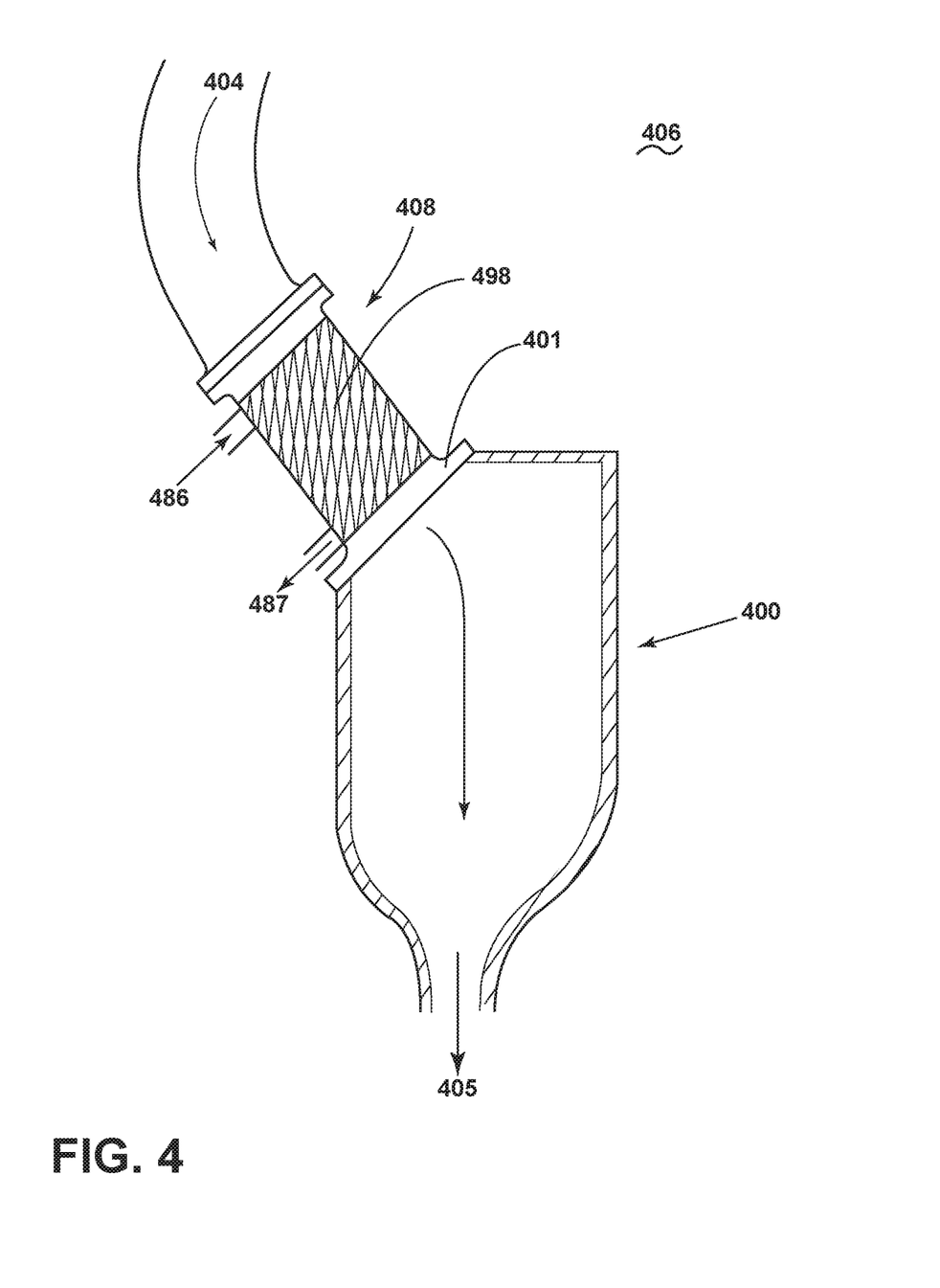
FIG. 4 is a schematic oil cooler heat exchanger according to another embodiment of the present innovation.

In another embodiment, an oil cooler heat exchanger 406 is integrated with the oil tank 400 or a portion of the oil tank 400 as a lid or cover 401 (see FIG. 4). In the case of the lid 401 forming the oil cooler heat exchanger 406, the lid 401 has a portion that is formed by a fuel matrix 498 material, which has multiple passages, or unit cells, through which the fuel can pass. A suitable fuel matrix 498 material can be manufactured by using additive manufacturing, such as 3-D printing, and is disclosed in U.S. patent application Ser. No. 61/905,511, which is incorporated by reference.

As shown in FIG. 4, the lid or cover 401 has a spout 408, which is formed by the fuel matrix 498. The spout 408 provides a point of connection for the oil inlet 404 to the oil tank 400. Alternatively, another portion or all of the lid 401 could be made of the fuel matrix 498.

Figures 5, 5A:
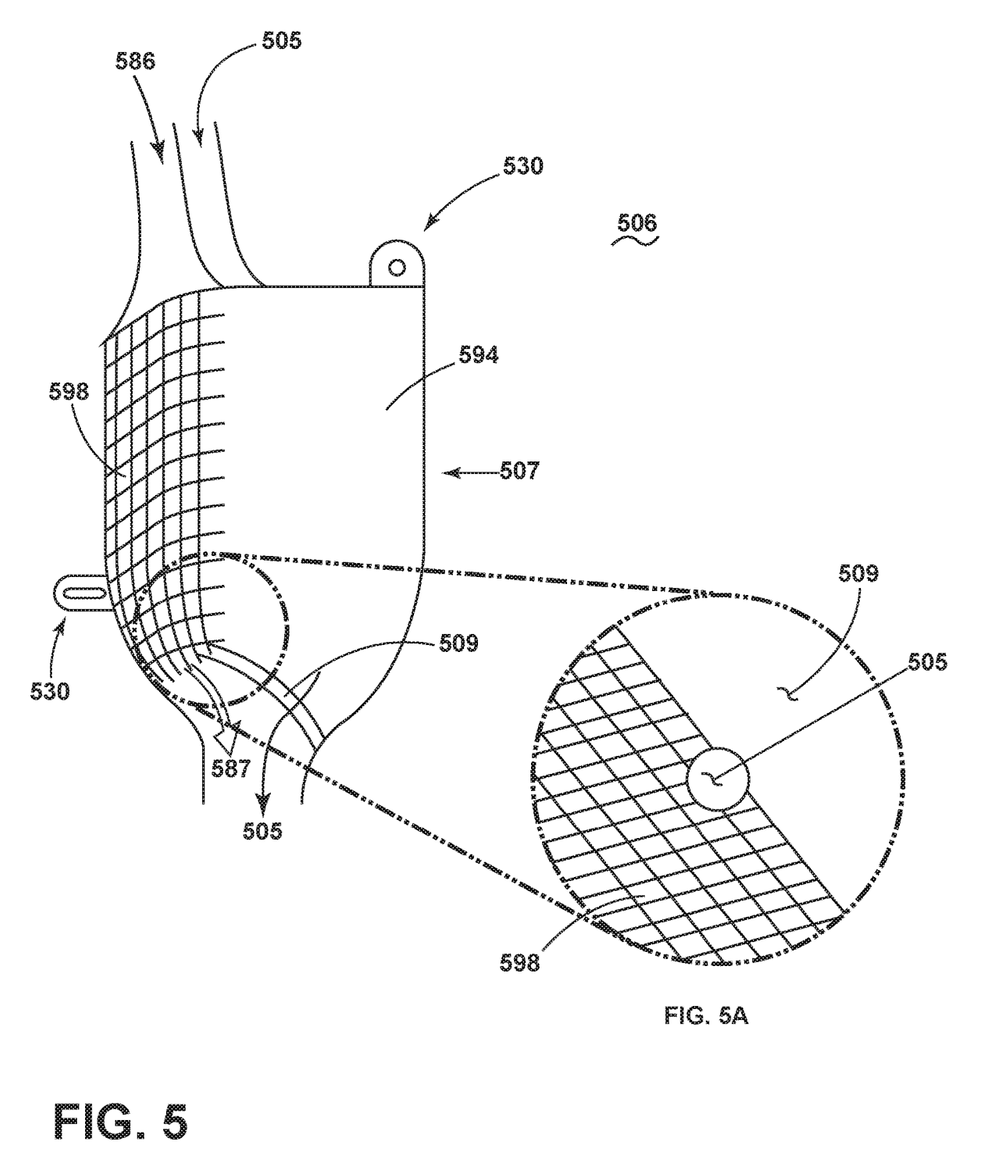
FIG. 5 is a schematic oil cooler heat exchanger according to another embodiment of the present innovation.
FIG. 5A is an enlarged cross-sectional view of the oil cooler heat exchanger of FIG. 5.

As an additional or alternative example embodiment, FIG. 5 illustrates an oil cooler heat exchanger 506 integrated into and/or forming a portion of a wall 594 forming the oil tank 500. While it is shown that the oil cooler heat exchanger 506 is integrated into a portion of the wall 594 forming the oil tank 500, it is not so limited and the oil cooler heat exchanger 506 may be integrated into the entire wall 594 of the oil tank 500. The oil tank 500 may be mounted to various structures using the mounts 530 to stabilize the oil tank 500. In this configuration, a portion of the oil cooler heat exchanger 506 is formed by a body 507 with an open cavity that serves as a bypass region 509. Fuel enters the fuel matrix 598 through the fuel inlet 586 and flows through the fuel matrix 589 until it reaches the fuel outlet 587 where it exits the fuel matrix 589. The bypass cavity 509 bypasses a portion of oil flow within the oil tank 500. For example, the bypass cavity 509 can utilize mechanisms such as a passive shunt or parallel flow.

FIG. 5A shows an enlarged cross-sectional view of the oil cooler heat exchanger 506.

Figures 6, 6A:
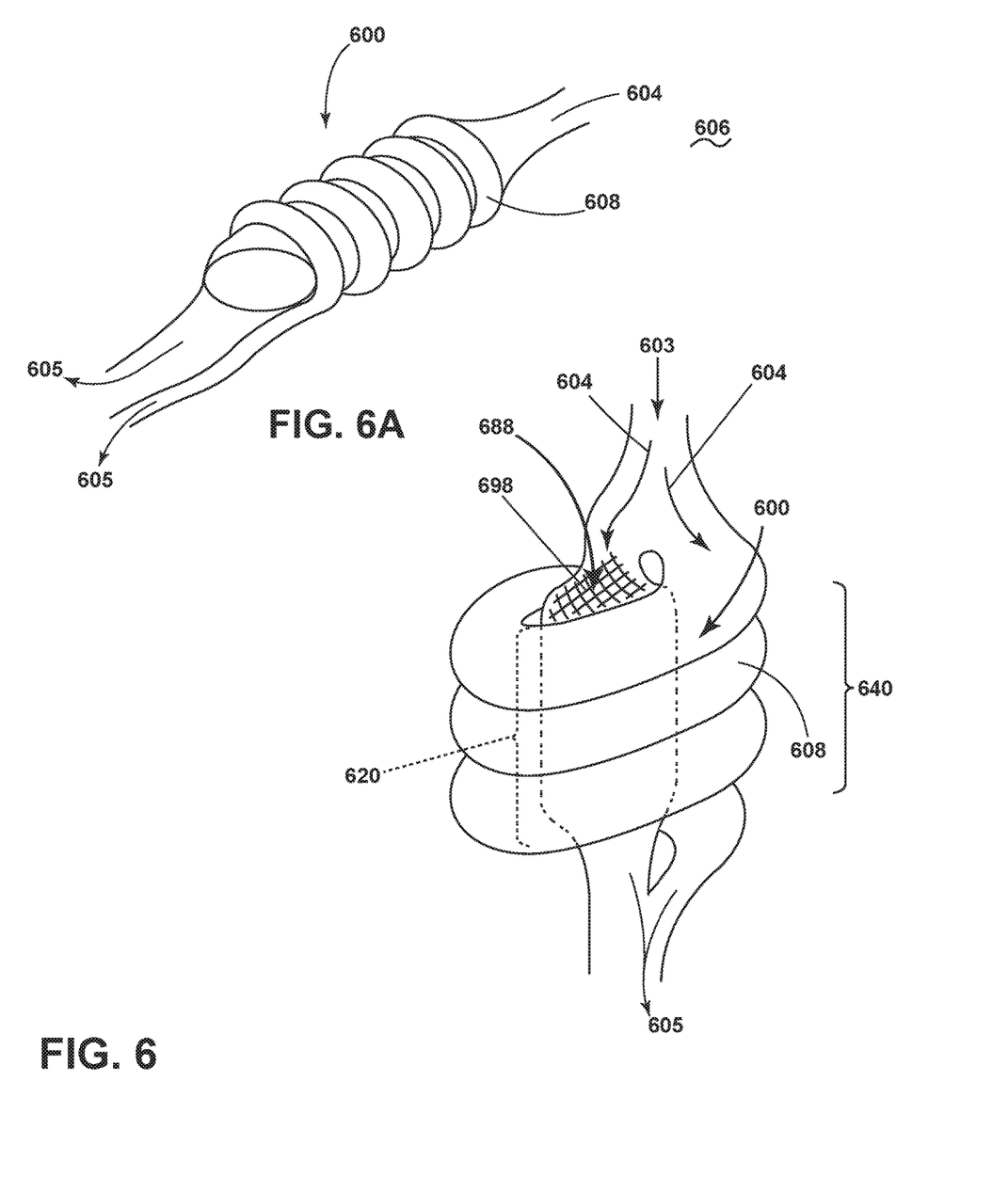
FIG. 6 is a schematic oil cooler heat exchanger of yet another embodiment of the present innovation.
FIG. 6A is a schematic oil cooler heat exchanger of FIG. 6 shown without hidden lines.

FIG. 6 illustrates an embodiment where the oil circuit 603 is bifurcated, or split into a first conduit 620, or cooling conduit, supplying an oil tank 600 in a manner similar to the embodiment of FIG. 5 and a second conduit 640 wrapping around the oil tank 600, partially illustrated by dotted lines in FIG. 6, and comprising a large coil 608, wherein the heat transfer efficiency is increased because each conduit of the split oil circuit 603 is cooled by the fuel matrix 698, which is in thermal conductive contact with at least a portion of the oil tank 600. Looking at FIG. 6 in greater detail, the first conduit 620 comprises an oil tank 600 in which the first conduit 620 is formed by the fuel matrix 698 forming part of the fuel circuit 688 to define an oil cooler heat exchanger 606. The second conduit 640 wraps around the oil cooler heat exchanger 606. The second conduit 640 can be in contact with the oil cooler heat exchanger 606 as it wraps around. Once the second conduit 640 is fully wrapped around the oil cooler heat exchanger 606, it can be joined with the first conduit 620. As yet an additional or alternative example for the embodiment of FIG. 6 the coil 608, can wrap around engine structure on an oil cooler heat exchanger 606 other than an oil tank 600.

Figure 7:
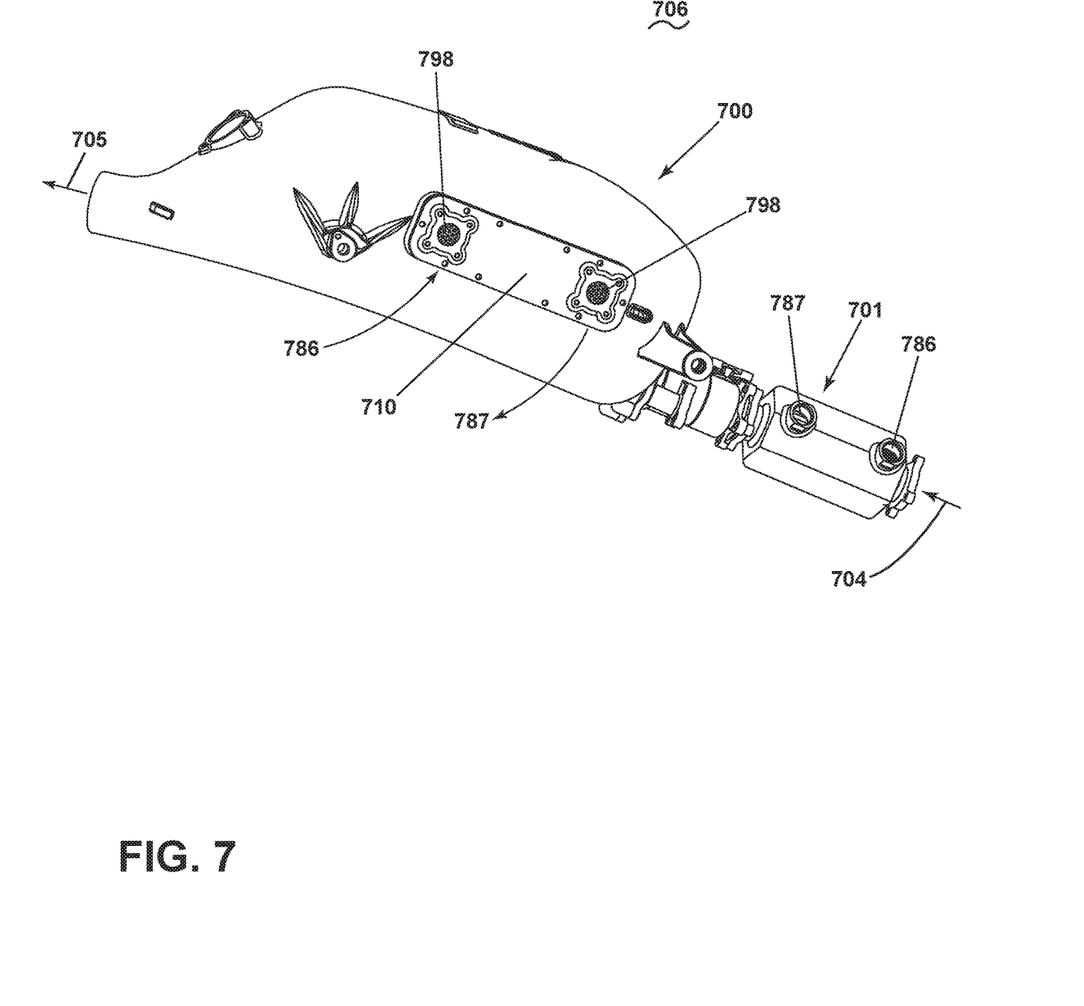
FIG. 7 is an oil cooler heat exchanger comprising the embodiment in FIG. 4 and another embodiment of the present innovation.
Figures 8, 8A:
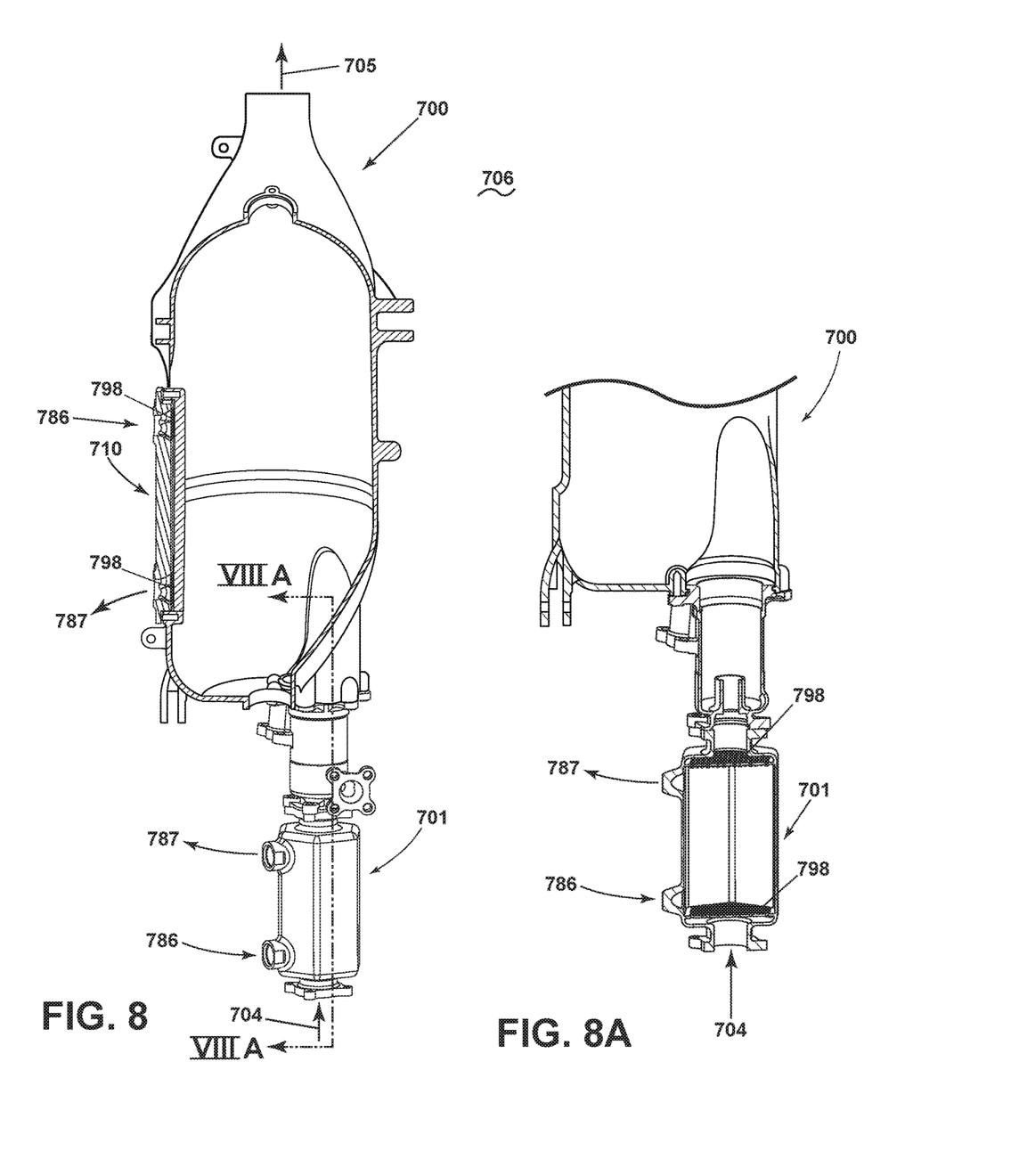
FIG. 8 is a cross section of the oil cooler heat exchanger in FIG. 7.
FIG. 8A is a cross section of the oil cooler heat exchanger in FIG. 8.

FIG. 7 is another embodiment of the present innovation wherein an oil tank 700 comprises an oil cooler heat exchanger 706 having a fuel matrix 798 integrated with a lid 701 and also integrated with a structural element 710 such as a support bracket, etc. For instance, the oil cooler heat exchanger 706 can form a portion of one or more support brackets, or structural elements 710, rather than forming the entire body. FIGS. 8 and 8A, are cross sectional views of the oil cooler heat exchangers in the embodiment of FIG. 7 to show greater detail of the fuel matrices 798. FIG. 8 is sectioned to show the fuel matrices 798 within the structural element 710. The fuel matrices 798 are located in the path that fuel flows from fuel inlet 786 to fuel outlet 787. FIG. 8A is sectioned along line BB of FIG. 8 to show the fuel matrices 798 within the lid 701. Fuel flows in through the fuel inlet 786, throughout the fuel matrix 798 integrated within the lid 701, and flows out of the fuel outlet 787.

During operation of the oil cooler heat exchanger 106, fuel from the fuel circuit 88 flows in through the fuel inlet 86, into the fuel matrix 98, and then exits through the fuel outlet 87. The fuel matrix 98 comprises a plurality of arranged unit cells. Fuel is contained within the unit cells, while oil from the oil tank 100 is located on the outside of the unit cells. The oil cooler heat exchanger 106 transfers, exchanges or otherwise passes heat contained in the oil to the fuel, thereby cooling the oil and heating the fuel. The fuel in the oil cooler heat exchanger 106 can flow multiple times around the oil tank 100.

An oil cooler heat exchanger 106 can be, for example, in the form of a radiator. Typically, fuel is circulated, moved or otherwise passed through a first part of the oil cooler heat exchanger 106, and oil (e.g., lubricating) is passed through a second oil cooler heat exchanger 106. The first and second parts of the oil cooler heat exchanger 106 can be separated, segregated, or otherwise divided. For example, fuel can be passed through a core of the oil cooled heat exchanger 106, and oil can be passed around the core.

Maintaining separate systems for the oil cooler heat exchanger 106 and the oil tank 100 increases complexity and costs. In addition, the separate systems can make require additional maintenance time, and the systems occupy valuable space on an aircraft. For example, separate oil cooler heat exchangers 106 and oil tanks 100 require additional piping to move oil and/or fuel between the separate systems and associated components (e.g., gearbox lubrication system, engine lubrication system, etc.). This innovation provides for an integrated oil cooler heat exchanger 106 and oil tank 100.

Additionally or alternatively, the integrated oil cooler heat exchanger 106 and oil tank 100 can provide a reduced part count, which can result in improved reliability, maintainability, and lower costs. Furthermore, the innovation provides for optimized fluid routing that can minimize piping and fluid routing lines, resulting in weight savings and system pressure drops. In addition, the total volume of oil needed by the system may be reduced.

This innovation provides for a combined oil tank 100 and oil cooler heat exchanger 106. The combined or integrated oil tank 100 and oil cooler heat exchanger 106 can be formed via a plurality of methods including, but not limited to, using a formed extrusion, or advanced manufacturing techniques, such as, three-dimensional printing and/or additive manufacturing or printing. Implementation of the combined oil tank and oil cooler heat exchanger 106 can be based on a number of factors including, but not limited to, system requirements, fitment, and heat exchanger style or variety.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
   an engine core with a combustion section;
   a fuel circuit fluidly coupled to the combustion section, at least a portion of the fuel circuit defining an intersection fuel matrix circuit;
   an oil circuit fluidly coupled to the engine core; and
   an oil reservoir tank having a wall defined by an outer surface and an inner surface defining an interior fluidly connected with the oil circuit, the oil reservoir tank including oil cooler heat exchanger comprising the fuel matrix circuit internal to a passage within the wall and disposed between the outer surface and the inner surface of the oil reservoir tank.

2. The gas turbine engine of claim 1 wherein the internal passage makes at least one pass around the interior.

3. The gas turbine engine of claim 1 wherein the oil tank comprises a cover and the fuel matrix circuit forms at least a portion of the cover.

4. The gas turbine engine of claim 1 wherein the oil circuit comprises a conduit and the fuel matrix circuit forms a portion of the conduit.

5. The gas turbine engine of claim 4 wherein the conduit is bifurcated to form first and second conduits and the fuel matrix forms part of the first conduit and the second conduit wraps around the fuel matrix.

6. The gas turbine engine of claim 1 wherein the oil tank is configured for storing a quantity of oil for the oil circuit.

7. The gas turbine engine of claim 1 wherein the wall includes a double wall defined by a first wall spaced from a second wall, and the fuel circuit matrix is disposed between the first wall and second wall.

8. The gas turbine engine of claim 7, wherein the entire fuel circuit matrix is disposed between the first wall and the second wall, wherein the first wall and the second wall are evenly spaced from each other.

9. The gas turbine engine of claim 1 wherein the entire fuel circuit matrix is disposed between the outer surface and the inner surface.

10. The gas turbine engine of claim 1 wherein the passage is a formed within the wall.

11. The gas turbine engine of claim 10 wherein the passage is formed internal to the wall.

12. The gas turbine engine of claim 10 wherein the passage is formed within the interior of the wall.

13. An oil tank assembly comprising:
    an oil reservoir tank having a wall defined by an outer surface and an inner surface defining an interior fluidly connected with an oil circuit; and
    a heat exchanger having a cooling conduit comprising a fuel matrix circuit internal to a passage within the wall and disposed between the outer surface and the inner surface of the oil reservoir tank.

14. The oil tank assembly of claim 13 wherein the internal passage makes at least one pass around the interior.

15. The oil tank assembly of claim 13 wherein the fuel matrix circuit forms a portion of the oil reservoir tank.

16. The oil tank assembly of claim 13 wherein the oil reservoir tank is configured for storing a quantity of oil for the oil circuit.

* * * * *